US010317100B2

(12) United States Patent
Tucker

(10) Patent No.: US 10,317,100 B2
(45) Date of Patent: Jun. 11, 2019

(54) SIMPLIFIED SCHEDULE PROGRAMMING OF AN HVAC CONTROLLER

(71) Applicant: Ademco Inc., Golden Valley, MN (US)

(72) Inventor: Jaymeson Tucker, Minneapolis, MN (US)

(73) Assignee: Ademco Inc., Golden Valley, MN (US)

( * ) Notice: Subject to any disclaimer, the term of this patent is extended or adjusted under 35 U.S.C. 154(b) by 131 days.

(21) Appl. No.: 15/217,826

(22) Filed: Jul. 22, 2016

(65) Prior Publication Data

US 2018/0023838 A1    Jan. 25, 2018

(51) Int. Cl.
| | |
|---|---|
| *F24F 11/30* | (2018.01) |
| *G05B 11/36* | (2006.01) |
| *G05B 19/4155* | (2006.01) |
| *F24F 11/58* | (2018.01) |
| *F24F 11/61* | (2018.01) |
| *F24F 11/52* | (2018.01) |
| *F24F 11/523* | (2018.01) |
| *G05D 23/19* | (2006.01) |

(52) U.S. Cl.
CPC .............. *F24F 11/30* (2018.01); *F24F 11/52* (2018.01); *F24F 11/523* (2018.01); *F24F 11/58* (2018.01); *F24F 11/61* (2018.01); *G05B 11/36* (2013.01); *G05B 19/4155* (2013.01); *G05D 23/1904* (2013.01); *G05B 2219/2614* (2013.01)

(58) Field of Classification Search
CPC .. F24F 11/0086; G05B 11/36; G05B 19/4155; G05B 2219/2614; G06F 3/04817
See application file for complete search history.

(56) References Cited

U.S. PATENT DOCUMENTS

| | | | |
|---|---|---|---|
| 3,656,112 | A | 4/1972 | Paul |
| 3,900,842 | A | 8/1975 | Calabro et al. |
| 4,079,366 | A | 3/1978 | Wong |
| 4,174,807 | A | 11/1979 | Smith et al. |
| 4,206,872 | A | 6/1980 | Levine |
| 4,215,408 | A | 7/1980 | Games et al. |

(Continued)

FOREIGN PATENT DOCUMENTS

| | | |
|---|---|---|
| DE | 3334117 | 4/1985 |
| EP | 0070414 | 1/1983 |

(Continued)

OTHER PUBLICATIONS

"A Full Range of Alternative User Interfaces for Building Occupants and Operators," http://www.automatedbuildings.com/news/jan00/articles/andover/andover.htm, 5 pages, dated Jan. 2000, printed Sep. 20, 2004.

(Continued)

*Primary Examiner* — Kenneth M Lo
*Assistant Examiner* — Michael J Huntley
(74) *Attorney, Agent, or Firm* — Shumaker & Sieffert, P.A.

(57) ABSTRACT

An HVAC controller may be configured to control one or more HVAC components within an HVAC system. The HVAC controller may include a user interface, such as but not limited to a touchscreen display, that enables a user to view and/or manipulate settings within the HVAC controller including but not limited to parameters within a programmable schedule. In some cases, the HVAC controller may provide the user with a better user experience when viewing or editing the programmable schedule.

19 Claims, 18 Drawing Sheets

(56) References Cited

U.S. PATENT DOCUMENTS

| | | |
|---|---|---|
| 4,224,615 A | 9/1980 | Penz |
| 4,235,368 A | 11/1980 | Neel |
| 4,264,034 A | 4/1981 | Hyltin et al. |
| 4,267,966 A | 5/1981 | Neel et al. |
| 4,270,573 A | 6/1981 | Sturman et al. |
| 4,296,334 A | 10/1981 | Wong |
| 4,298,946 A | 11/1981 | Hartsell et al. |
| 4,308,991 A | 1/1982 | Peinetti et al. |
| 4,337,822 A | 7/1982 | Hyltin et al. |
| 4,357,665 A | 11/1982 | Korff |
| 4,382,544 A | 5/1983 | Stewart |
| 4,386,649 A | 6/1983 | Hines et al. |
| 4,388,692 A | 6/1983 | Jones et al. |
| 4,399,510 A | 8/1983 | Hicks |
| 4,429,299 A | 1/1984 | Kabat et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,506,827 A | 3/1985 | Jamieson et al. |
| 4,510,398 A | 4/1985 | Culp et al. |
| 4,511,979 A | 8/1985 | Amirante |
| 4,551,812 A | 11/1985 | Gurr et al. |
| 4,556,865 A | 12/1985 | Fukagawa et al. |
| 4,591,988 A | 5/1986 | Klima et al. |
| 4,606,401 A | 8/1986 | Levine et al. |
| 4,608,560 A | 8/1986 | Allgood |
| 4,621,336 A | 11/1986 | Brown |
| 4,622,544 A | 11/1986 | Bially et al. |
| 4,630,670 A | 12/1986 | Wellman et al. |
| 4,642,607 A | 2/1987 | Strom et al. |
| 4,657,179 A | 4/1987 | Aggers et al. |
| 4,656,835 A | 8/1987 | Kiddler |
| 4,717,333 A | 1/1988 | Carignan |
| 4,725,001 A | 2/1988 | Carney et al. |
| 4,730,941 A | 3/1988 | Levine et al. |
| 4,742,475 A | 5/1988 | Kaiser et al. |
| 4,771,185 A | 9/1988 | Feron et al. |
| 4,783,800 A | 11/1988 | Levine |
| 4,819,714 A | 4/1989 | Otsuka et al. |
| 4,837,731 A | 6/1989 | Levine et al. |
| 4,881,686 A | 11/1989 | Mehta |
| 4,909,041 A | 3/1990 | Jones |
| 4,916,328 A | 4/1990 | Culp, III |
| 4,918,439 A | 4/1990 | Wozniak et al. |
| 4,924,404 A | 5/1990 | Reinke, Jr. |
| 4,948,040 A | 8/1990 | Kobayashi et al. |
| 4,992,779 A | 2/1991 | Sugino et al. |
| 4,997,029 A | 3/1991 | Otsuka et al. |
| 5,003,457 A | 3/1991 | Ikei et al. |
| 5,012,973 A | 5/1991 | Dick et al. |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,107,918 A | 4/1992 | McFarlane et al. |
| 5,140,310 A | 8/1992 | DeLuca et al. |
| 5,153,837 A | 10/1992 | Shaffer et al. |
| 5,161,606 A | 11/1992 | Berkeley et al. |
| 5,170,935 A | 12/1992 | Federspiel et al. |
| 5,181,653 A | 1/1993 | Foster et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,270,952 A | 12/1993 | Adams et al. |
| 5,289,362 A | 2/1994 | Liebl et al. |
| 5,329,991 A | 7/1994 | Mehta et al. |
| 5,348,078 A | 9/1994 | Dushane et al. |
| 5,386,577 A | 1/1995 | Zenda |
| 5,392,042 A | 2/1995 | Pellon |
| 5,395,042 A | 3/1995 | Riley et al. |
| 5,412,377 A | 5/1995 | Evans et al. |
| 5,461,558 A | 10/1995 | Patsiokas et al. |
| 5,481,481 A | 1/1996 | Frey et al. |
| 5,482,209 A | 1/1996 | Cochran et al. |
| 5,526,422 A | 6/1996 | Keen |
| 5,537,106 A | 7/1996 | Mitsuhashi |
| 5,544,036 A | 8/1996 | Brown, Jr. et al. |
| 5,566,879 A | 10/1996 | Longtin |
| 5,570,837 A | 11/1996 | Brown et al. |
| 5,644,173 A | 7/1997 | Elliason et al. |
| 5,673,850 A | 10/1997 | Uptegraph |
| 5,782,296 A | 7/1998 | Mehta |
| 5,802,467 A | 9/1998 | Salazar et al. |
| 5,818,428 A | 10/1998 | Eisenbrandt et al. |
| 5,873,519 A | 2/1999 | Beilfuss |
| 5,886,697 A | 3/1999 | Naughton et al. |
| 5,901,183 A | 5/1999 | Garin et al. |
| 5,902,183 A | 5/1999 | D'Souza |
| 5,909,378 A | 6/1999 | De Milleville |
| 5,937,942 A | 8/1999 | Bias et al. |
| 5,947,372 A | 9/1999 | Tiernan |
| 6,009,355 A | 12/1999 | Obradovich et al. |
| 6,020,881 A | 2/2000 | Naughton et al. |
| 6,032,867 A | 3/2000 | Dushane et al. |
| 6,059,195 A | 5/2000 | Adams et al. |
| 6,081,197 A | 6/2000 | Garrick et al. |
| 6,121,875 A | 9/2000 | Hamm et al. |
| 6,140,987 A | 10/2000 | Stein et al. |
| 6,144,971 A | 11/2000 | Sunderman et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,236,326 B1 | 5/2001 | Murphy |
| 6,256,378 B1 | 7/2001 | Iggulden et al. |
| 6,285,912 B1 | 9/2001 | Ellison et al. |
| 6,290,140 B1 | 9/2001 | Pesko et al. |
| 6,305,611 B1 | 10/2001 | Proffitt et al. |
| 6,315,211 B1 | 11/2001 | Sartain et al. |
| 6,318,639 B1 | 11/2001 | Toth |
| 6,323,882 B1 | 11/2001 | Jerome et al. |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,398,118 B1 | 6/2002 | Rosen et al. |
| 6,478,233 B1 | 11/2002 | Shah |
| 6,502,758 B2 | 1/2003 | Cottrell |
| 6,518,957 B1 | 2/2003 | Lehtinen et al. |
| 6,553,777 B2 | 4/2003 | Dillenback |
| 6,578,770 B1 | 6/2003 | Rosen |
| 6,580,950 B1 | 6/2003 | Johnson et al. |
| 6,581,848 B1 | 6/2003 | Plica |
| 6,595,430 B1 | 7/2003 | Shah |
| 6,619,555 B2 | 9/2003 | Rosen |
| 6,621,507 B1 | 9/2003 | Shah |
| 6,628,997 B1 | 9/2003 | Fox et al. |
| 6,658,303 B2 | 12/2003 | Hatemata |
| 6,685,098 B2 | 2/2004 | Okano et al. |
| 6,687,678 B1 | 2/2004 | Yorimatsu et al. |
| 6,718,213 B1 | 4/2004 | Enberg |
| 6,782,706 B2 | 8/2004 | Holmes et al. |
| 6,783,079 B2 | 8/2004 | Carey et al. |
| 6,786,421 B2 | 9/2004 | Rosen |
| 6,789,739 B2 | 9/2004 | Rosen |
| 6,824,069 B2 | 11/2004 | Rosen |
| 6,833,990 B2 | 12/2004 | LaCroix et al. |
| 6,845,918 B2 | 1/2005 | Rotondo |
| 6,851,621 B1 | 2/2005 | Wacker et al. |
| 6,886,754 B2 | 5/2005 | Smith et al. |
| 6,975,958 B2 | 12/2005 | Bohrer et al. |
| 6,983,889 B2 | 1/2006 | Alles |
| 6,997,390 B2 | 2/2006 | Alles |
| 7,001,495 B2 | 2/2006 | Essalik |
| D518,744 S | 4/2006 | Rosen |
| 7,028,912 B1 | 4/2006 | Rosen |
| 7,050,026 B1 | 5/2006 | Rosen |
| 7,089,066 B2 | 8/2006 | Hesse et al. |
| 7,114,554 B2 | 10/2006 | Bergman et al. |
| 7,130,719 B2 | 10/2006 | Ehlers et al. |
| 7,142,948 B2 | 11/2006 | Metz |
| 7,146,253 B2 | 12/2006 | Hoog et al. |
| 7,152,802 B2 | 12/2006 | Kell et al. |

(56) References Cited

U.S. PATENT DOCUMENTS

| | | | |
|---|---|---|---|
| 7,152,806 B1 | 12/2006 | Rosen | |
| 7,156,318 B1 | 1/2007 | Rosen | |
| 7,302,642 B2 | 11/2007 | Smith et al. | |
| 7,306,165 B2 | 12/2007 | Shah | |
| 7,310,559 B2 | 12/2007 | Walko, Jr. | |
| 7,320,110 B2 | 1/2008 | Shah | |
| 7,455,240 B2 | 11/2008 | Chapman, Jr. et al. | |
| 7,460,933 B2 | 12/2008 | Chapman, Jr. et al. | |
| 7,556,207 B2* | 7/2009 | Mueller | F24F 11/0086 236/94 |
| 7,604,046 B2 | 10/2009 | Bergman et al. | |
| 7,624,931 B2 | 12/2009 | Chapman, Jr. et al. | |
| 7,636,604 B2 | 12/2009 | Bergman et al. | |
| D610,027 S | 2/2010 | Li et al. | |
| 7,693,582 B2 | 4/2010 | Bergman et al. | |
| 7,706,923 B2 | 4/2010 | Amundson et al. | |
| 7,861,941 B2 | 1/2011 | Schultz et al. | |
| 7,890,195 B2 | 2/2011 | Bergman et al. | |
| 8,032,254 B2 | 10/2011 | Amundson et al. | |
| 8,083,154 B2 | 12/2011 | Schultz et al. | |
| 8,219,251 B2* | 7/2012 | Amundson | G05B 19/0426 700/276 |
| 8,244,383 B2 | 8/2012 | Bergman et al. | |
| 8,306,669 B1 | 11/2012 | Smith et al. | |
| 8,346,396 B2* | 1/2013 | Amundson | F24F 11/0086 700/276 |
| 8,523,084 B2 | 9/2013 | Siddaramanna et al. | |
| 8,527,096 B2 | 9/2013 | Pavlak et al. | |
| 8,620,460 B2 | 12/2013 | Bergman et al. | |
| 8,893,032 B2 | 11/2014 | Bruck et al. | |
| 9,014,860 B2 | 4/2015 | Moore et al. | |
| 9,026,253 B2 | 5/2015 | Majewski et al. | |
| 9,081,393 B2 | 7/2015 | Lunacek et al. | |
| 9,388,998 B2 | 7/2016 | Khoury et al. | |
| 2001/0029585 A1 | 10/2001 | Simon et al. | |
| 2001/0052459 A1 | 12/2001 | Essalik et al. | |
| 2002/0085037 A1* | 7/2002 | Leavitt | G06F 3/04817 715/765 |
| 2002/0092779 A1 | 7/2002 | Essalik et al. | |
| 2003/0034897 A1 | 2/2003 | Shamoon et al. | |
| 2003/0034898 A1 | 2/2003 | Shamoon et al. | |
| 2004/0245352 A1 | 12/2004 | Smith | |
| 2004/0260411 A1 | 12/2004 | Cannon | |
| 2004/0262410 A1 | 12/2004 | Hull | |
| 2005/0108091 A1 | 5/2005 | Sotak et al. | |
| 2005/0119766 A1 | 6/2005 | Amundson et al. | |
| 2006/0004492 A1 | 1/2006 | Terlson et al. | |
| 2006/0030954 A1* | 2/2006 | Bergman | G05B 19/106 700/19 |
| 2007/0029397 A1 | 2/2007 | Mueller et al. | |
| 2007/0045441 A1 | 3/2007 | Ashworth et al. | |
| 2007/0228182 A1 | 10/2007 | Wagner et al. | |
| 2007/0257120 A1 | 11/2007 | Chapman, Jr. et al. | |
| 2009/0045263 A1 | 2/2009 | Mueller et al. | |
| 2009/0140056 A1* | 6/2009 | Leen | F24F 11/0086 236/49.3 |
| 2010/0106305 A1 | 4/2010 | Pavlak et al. | |
| 2012/0318135 A1 | 12/2012 | Hoglund et al. | |
| 2013/0027412 A1* | 1/2013 | Roddy | G04C 23/345 345/501 |
| 2013/0060385 A1* | 3/2013 | Leen | F24F 11/0009 700/276 |
| 2013/0158720 A1* | 6/2013 | Zywicki | G05D 23/1934 700/276 |
| 2013/0227413 A1* | 8/2013 | Thorsander | G06F 3/0482 715/716 |
| 2013/0338838 A1* | 12/2013 | Moore | F24F 11/0086 700/278 |
| 2013/0345882 A1* | 12/2013 | Dushane | G05B 15/02 700/276 |
| 2014/0118285 A1 | 5/2014 | Poplawski | |
| 2014/0316581 A1* | 10/2014 | Fadell | G05D 23/1904 700/276 |
| 2014/0321092 A1 | 10/2014 | Novotny et al. | |
| 2014/0324229 A1 | 10/2014 | Leen et al. | |
| 2015/0094865 A1* | 4/2015 | Choi | F24F 11/0086 700/278 |
| 2015/0204569 A1 | 7/2015 | Lorenz et al. | |
| 2015/0327084 A1 | 11/2015 | Ramachandran et al. | |
| 2015/0355371 A1 | 12/2015 | Ableitner et al. | |
| 2016/0018127 A1 | 1/2016 | Gourlay et al. | |
| 2016/0209072 A1 | 7/2016 | Golden et al. | |

FOREIGN PATENT DOCUMENTS

| | | |
|---|---|---|
| EP | 0678204 | 3/2000 |
| EP | 0985994 | 3/2000 |
| EP | 1033641 | 9/2000 |
| EP | 1074009 | 2/2001 |
| FR | 2711230 | 4/1995 |
| WO | WO 97/11448 | 3/1997 |
| WO | WO 97/39392 | 10/1997 |
| WO | WO 01/52515 | 7/2001 |
| WO | WO 01/79952 | 10/2001 |

OTHER PUBLICATIONS

"CorAccess Systems/in Home," http://web.archive.org/web20011212084427/www.coraccess.com/home.html, 1 page, copyright 2001, printed Aug. 19, 2004.

"HAI Company Background," http://www.homeauto.com/AboutHAI/abouthai_main.htm, 2 pages, printed Aug. 19, 2004.

"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.

"Home Toys Review—TouchLinc", http://www.hometoys.com/htinews/aug99/reviews/touchlinc/touchlinc.htm, 3 pages, dated Aug. 1999, printed Autust 20, 2004.

"Mark of Excellence Award Finalist Announced," http://64.233.167.104/search?Q=cache:ciOA2YtYaBIJ:www.hometoys.com/releases/mar. . . , 6 pages, Leopard Touchscreen on p. 2, dated prior to Mar. 4, 2000, printed Aug. 20, 2004.

"Product Review—Philips Pronto Remote Control," http://hometheaterhifi.com/volume_6_2/philipsprontoremotecontrol.html, 5 pages, dated May 1999, printed Aug. 20, 2004.

"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.

"Spotlight on integrated systems," Custom Builder, vol. 8, No. 2, p. 66(6), Mar.-Apr. 1993.

ADI, "Leopard User Manual," 93 pages, 2001.

Adicon 2500, "The Automator," 4 pages, Oct.-Dec. 2000.

ADT Security Services, "iCenter Advanced User Interface 8142ADT," Installation and Setup Guide, 5 pages, May 2001; First Sale Feb. 2001.

ADT Security Systems, "iCenter Advanced User Interface 8142ADT User Guide," pp. 1-136, 2001.

Aprilaire Electronic Thermostats Models 8344, 8346, 8348, 8363, 8365, 8366 Operating Instructions, 8 pages, 2003.

Aube Technologies, Electronic Thermostat for Heating System Model TH135-01, 5 pages, Aug. 14, 2001.

Aube Technologies, TH140-28 Electronic Programmable Thermostat, Installation Instructions and User Guide, pp. 1-4, Jan. 22, 2004.

Blake et al., "Seng 310 Final Project Demo Program" Illustration, 3 pages, Apr. 6, 2001.

Blake et al., "Seng 310 Final Project" Report, dated Apr. 6, 2001.

Blister Pack Insert from a Ritetemp 8082 Touch Screen Thermostat Product, 2 pages, 2002.

Braeburn Model 3000 Owner's Manual, pp. 1-13, 2001.

Braeburn Model 5000 Owners Manual, pp. 1-17, 2001.

BRK Electronics Maximum Protection Plus Ultimate Convenience Smoke Alarm, 24 pages, Sep. 2000.

BRK First Alert, User's Manual, Smoke and Fire Alarms, pp. 1-7, Nov. 2002.

(56) References Cited

OTHER PUBLICATIONS

Business Wire, "MicroTouch Specialty Products Group to Capitalize on Growing Market for Low-Cost Digital Matrix Touchscreens," p1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRFO1 Programmable Digital Thermostat, pp. 1-21, prior to Apr. 21, 2005.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16 2002.
Domotique Secant Home Automation—Web Page, available at http://www.secant.ca/En/Company/Default.asp, 1 page, printed Sep. 28, 2004.
Firex Smoke Alarm, Ionization Models AD, ADC Photoelectric Model Pad, 4 pages, prior to Apr. 21, 2005.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Powered, 120V, 60Hz with Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered with Battery Backup, Installation Instructions—Owner's Information, pp. 9-1 to 9-6, Jan. 1, 1993.
Home Automation, Inc., "OmniPro Owner's Manual," 153 pages, prior to Dec. 27, 2010.
Home Automation, Inc., "OmniTouch Touchscreen Model 32A00-1, Uses Guide," Document No. 32R00-1 Rev A, 15 pages, Aug. 2003.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A.0 Chronotherm Ill Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "FocusPRO TH6000 Series Programmable Thermostat, Operating Manual," 26 pages, Mar. 2011.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/nodel.html, "Contents," 53 pages, printed Sep. 20, 2004.
http://www.hometoys.com/htinews/apr99/releases/ha101.htm, HTI News Release, pp. 1-3, printed Oct. 28, 2004.
http://www.ritetemp.info/rtMenu_13.html, Rite Temp 8082, 8 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Lennox User's Manual, "Network Control Panel (NCP)," pp. 1-18, Nov. 1999.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "511 Series Smart Temp Electronic Thermostat," Owner's Manual, 3 pages, prior to Jul. 7, 2004.
Lux, "600 Series Smart Temp Electronic. Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Matty, "Advanced Energy Management for Home Use", in IEEE Transactions on Consumer Electronics, vol. 35, No. 3, Aug. 1989.
Metasys, "HVAC PRO for Windows User's Manual," 308 pages, 1998.
Mounting Template for Ritetemp Thermostat 8082, 1 page, 2002.
Proliphix, "Web Enabled IP Thermostats, Intelligent HVAC Control," Proliphix Inc., 2 pages, on or before Aug. 28, 2004.
Quick Start Guide for Ritetemp Thermostat 8082, 1 page, 2002.
Remote Control Power Requirement for Ritetemp Thermostat 8082, 1 page, 2002.
Raji, "Smart Networks for Control," Jun. 1994, IEEE Spectrum. pp. 49-55.
Ritetemp Operation 8029, 3 pages, Jun. 19, 2002.

(56) References Cited

OTHER PUBLICATIONS

Ritetemp Operation 8050, 5 pages, Jun. 26, 2002.
Ritetemp Operation 8085, pp. 1-6, prior to Apr. 21, 2005.
Sealed Unit Parts Co., Inc., Supco & CTC Thermostats . . . loaded with features, designed for value!, 6 pages, prior to Apr. 21, 2005.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01 D-EN," 623 pages, 2002.
Trouble Shooting Guide for Ritetemp Thermostat 8082, 1 page, 2002.
Vantage Expands Controls for Audio/Video, HVAC and Security, http://www.hometoys.com/htinews/aug99/releases/vantage03.htm, 2 pages, dated Aug. 3, 1999, printed Aug. 20, 2004.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat " 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.

\* cited by examiner

SIMPLIFIED SCHEDULE PROGRAMMING OF AN HVAC CONTROLLER

TECHNICAL FIELD

The present disclosure pertains to Heating, Ventilation, and/or Air Conditioning (HVAC) systems. More particularly, the present disclosure pertains to HVAC controllers, such as thermostats, with programmable schedules.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In many cases, the HVAC controller is mounted to an internal wall of the building and provides control signals to various HVAC components of the HVAC system. In some cases, the HVAC controller operates the HVAC system in accordance with a programmable schedule that may be stored in memory within the HVAC controller. A user such as, for example, a homeowner may manipulate the programmable schedule via a user interface of the HVAC controller. Improvements in the hardware, user experience, and functionality of such HVAC controllers would be desirable.

SUMMARY

The disclosure is directed to an HVAC controller that may be configured to control one or more HVAC components within an HVAC system. The HVAC controller may include a user interface, such as but not limited to a touchscreen display, that enables a user to view and/or manipulate settings within the HVAC controller including but not limited to parameters of a programmable schedule. In some cases, the HVAC controller may provide the user with a better user experience when viewing and/or editing the programmable schedule.

In a particular example of the disclosure, an HVAC controller may be configured to control one or more HVAC components in accordance with a programmable schedule that includes a plurality of schedule periods. The HVAC controller may include a housing for housing several components, including a touch screen display that is accessible from outside the housing, a memory and a controller that is operably coupled to the memory and to the touch screen display. The controller may be configured to control the one or more HVAC components in accordance with the programmable schedule and may be further configured to permit a user to navigate through a linearly ordered series of screens to display each of the plurality of schedule periods of the programmable schedule. In some instances, each displayed schedule period screen may concurrently display a plurality of schedule parameters on the touch screen display, where each of the schedule parameters can be individually selected by the user for editing by touching the corresponding schedule parameter via the touch screen display. The controller may be further configured to permit the user to edit the selected schedule parameter and to permit the user to navigate to another of the plurality of schedule periods of the programmable schedule after selecting and/or editing a selected schedule parameter.

In another example of the disclosure, an HVAC controller may be configured to control one or more HVAC components in accordance with a programmable schedule that includes a plurality of schedule periods. The HVAC controller may include a fixed segment touch screen display, a memory configured to store the programmable schedule and a controller that is operably coupled to the memory and the fixed segment touch screen display. The controller may be configured to control the one or more HVAC components in accordance with the programmable schedule and may include a schedule edit mode. In the schedule edit mode, the controller may permit a user to navigate to a selected one of the plurality of schedule periods, concurrently display a plurality of parameters for the selected one of the plurality of schedule periods on the fixed segment touch screen display, permit the user to select any one of the concurrently displayed plurality of parameters for editing by touching the selected one of the plurality of parameters on the fixed segment touch screen display, and permit the user to change a value of the selected one of the plurality of parameters by interacting with the fixed segment touch screen display.

In another example of the disclosure, an HVAC controller may be configured to control one or more HVAC components in accordance with a programmable schedule that includes a plurality of schedule periods. The HVAC controller may include a touch screen display defining a plurality of individual touch regions each located at a fixed location on the touch screen display. A memory may be configured to store a programmable schedule having a plurality of schedule periods, each of the plurality of schedule periods including a plurality of schedule parameters. A controller may be operably coupled to the memory and the touch screen display and may be configured to control the one or more HVAC components in accordance with the programmable schedule. The controller may be further configured to permit a user to navigate through a linearly ordered series of screens using one or more of the plurality of individual touch regions to sequentially display each of the plurality of schedule periods of the programmable schedule, wherein each displayed schedule period may include a plurality of schedule parameters concurrently displayed on the touch screen display with at least one of the plurality of schedule parameters displayed at a location on the touch screen display that overlaps with a corresponding one of the plurality of individual touch regions. The controller may be further configured to permit a user to individually select one of the at least one of the plurality of schedule parameters for editing by touching the corresponding individual touch region, and to permit the user to edit the selected one of the plurality of schedule parameters by touching one or more of the individual touch regions that are defined for that purpose.

The above summary of some embodiments is not intended to describe each disclosed embodiment or every implementation of the present disclosure. The Figures, and Detailed Description, which follow, more particularly exemplify some of these embodiments.

BRIEF DESCRIPTION OF THE FIGURES

The disclosure may be more completely understood in consideration of the following description of various illustrative embodiments of the disclosure in connection with the accompanying drawings, in which:

FIGS. 10A through 10E schematically show a series of screens that may be displayed by the HVAC controller of FIG. 3 or FIG. 4.

Figure 1:
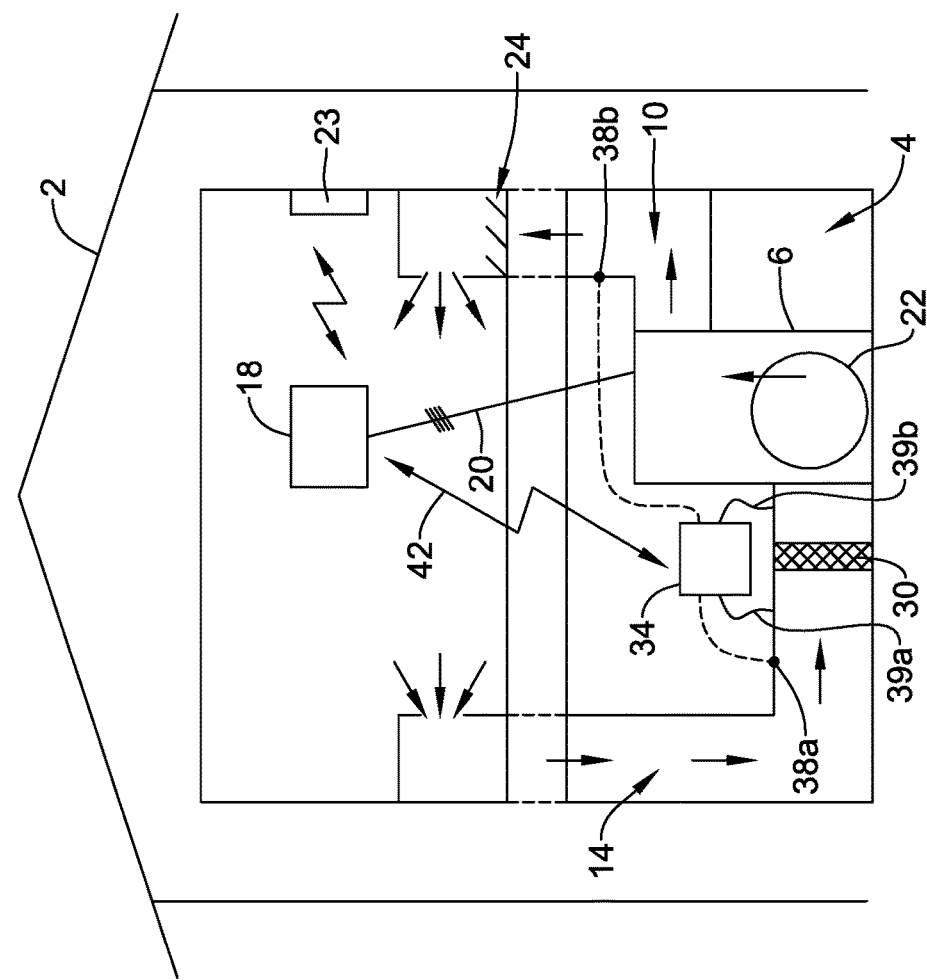
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC sometimes under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature—return air temperature)

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
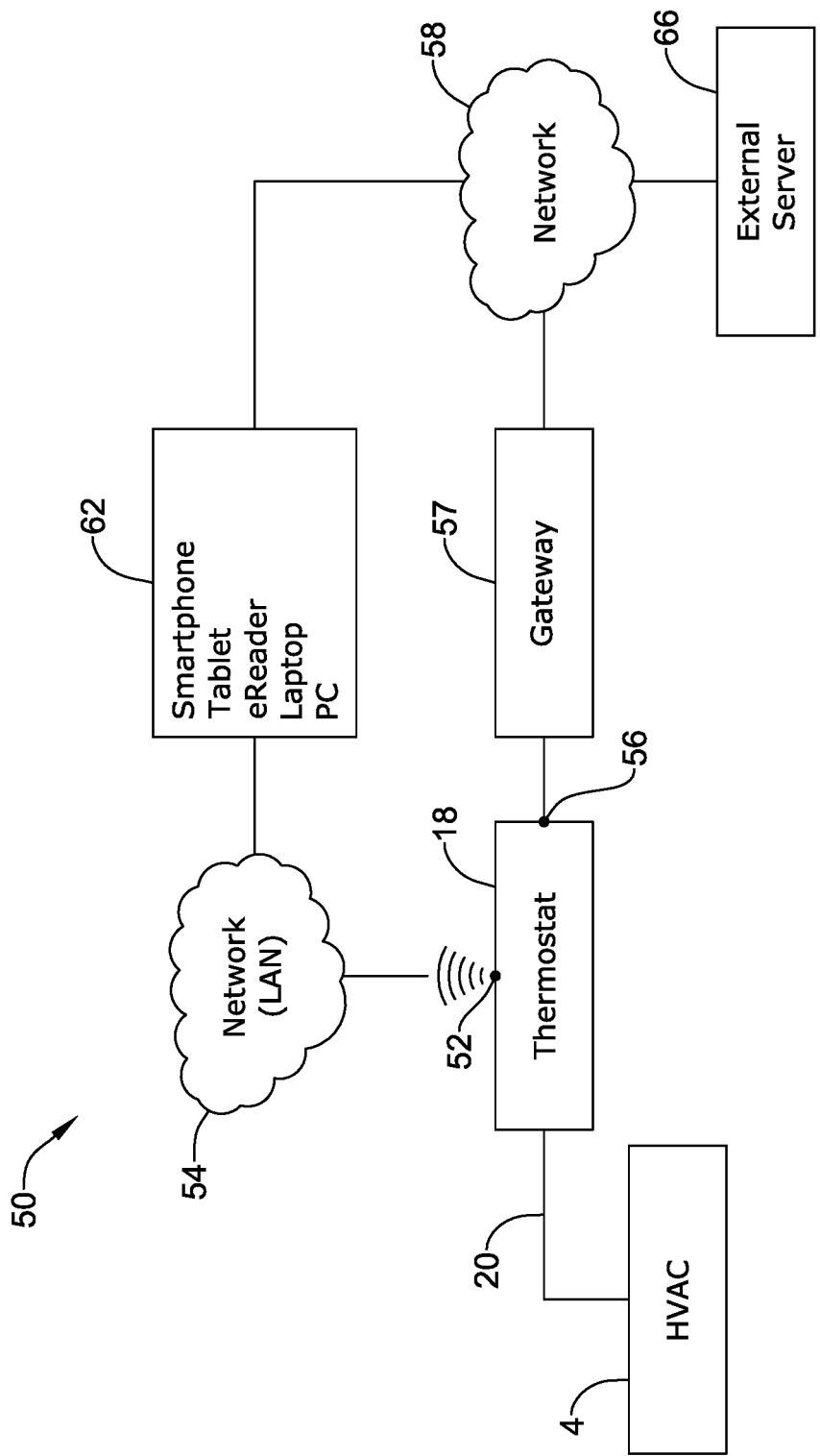
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, communications over a second network 58 may pass through a gateway 57, but this is not required in all cases. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be downloaded from an external web service, such as the web service hosted by the external web server 66 (e.g. Honeywell's TOTAL CONNECT™ web service) or another external web service (e.g. ITUNES® or Google Play). In some cases, the app may provide a remote user interface for interacting with the HVAC controller 18 at the user's remote device 62. For example, through the user interface provided by the app, a user may be able to change operating parameter settings such as, for example, temperature set points, humidity set points, start times, end times, schedules, window frost protection settings, accept software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may be routed to the web server 66 and then from the web server 66 to the remote device 62 where it may reflected by the application program executed by the remote device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote device 62 and the HVAC controller 18 without being relayed through a server such as external server 66. These are just some examples.

Figure 3:
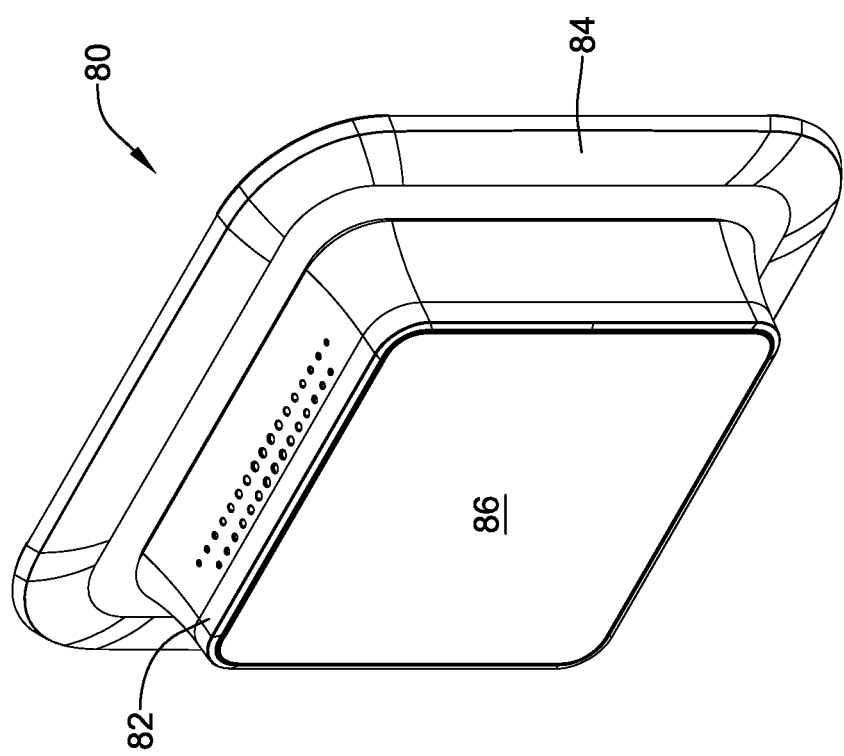
FIG. 3 is a perspective view of an illustrative thermostat assembly that may be used in the HVAC system of FIG. 1 or FIG. 2.

FIG. 3 is a perspective view of an illustrative thermostat assembly 80. In some instances, the thermostat assembly 80 may be considered as an example of the HVAC controller 18 referenced in FIGS. 1 and 2. In some instances, the thermostat assembly 80 may include a thermostat 82 and a trim piece 84. The thermostat 82 may include a user interface 86 which, in some cases, may be a touch screen display such as a fixed segment touch screen display or a dot matrix touch screen display. It will be appreciated that if the user interface 86 is a fixed segment touch screen display, the ability of the thermostat 82 to rearrange what is displayed where on the user interface 86 may be somewhat limited. In some cases, it will be appreciated that a touch screen display may, for example, have any number of predetermined and distinct touch points where the touch screen display is configured to sense that the touch point has been touched or is being touched. In some cases, the touch screen display may have a relatively limited number of distinct touch points in order to reduce costs, for example.

Figure 4:
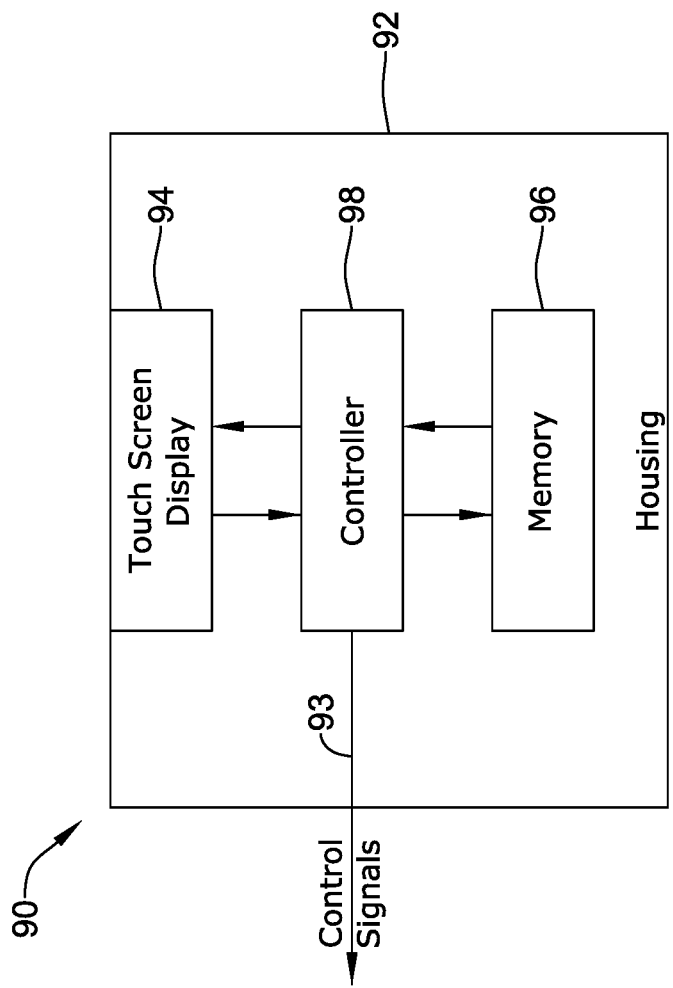
FIG. 4 is a schematic view of an illustrative HVAC controller that may, for example, form part of the HVAC system of FIG. 1 or FIG. 2.

FIG. 4 is a schematic view of an illustrative HVAC controller 90 that may, for example, be configured to control one or more HVAC components (such as but not limited to the HVAC component(s) 6 shown in FIG. 1 as part of the HVAC system 4) in accordance with a programmable schedule. In some cases, the programmable schedule may include a plurality of schedule periods. For example, in some cases, the programmable schedule may include up to four different time periods each day. In some cases, these four time periods may be identified as WAKE, AWAY, HOME and SLEEP. In some instances, the programmable schedule may include additional time periods. In some cases, the programmable schedule may include fewer than four distinct time periods.

In some instances, the programmable schedule may be known as a 7 day schedule, in which each of the seven days of the week may be uniquely programmed but are not required to be. In some cases, the programmable schedule may be known as a 5-2 schedule, in which each of the weekdays Monday through Friday share a first programming schedule and the weekend days Saturday and Sunday share a second programming schedule. In some cases, the programmable schedule may be known as a 5-1-1 schedule, in each of the weekdays Monday through Friday share a first programming schedule, and Saturday and Sunday each can have their own unique schedule.

In some cases, the HVAC controller 90 may include a housing 92. In some instances, the housing 92 may be considered as forming the outer structure of the thermostat 82 (e.g. see FIG. 3), although this is not required in all cases. A touch screen display 94 may be disposed within the housing 92 and accessible by a user from outside of the housing 92. In some cases, for example, the touch screen display 94 may form a portion of an outer surface, such as the front of the outer surface, of the housing 92. The HVAC controller 90 may also include a memory 96 that may be configured to store the programmable schedule. In some instances, the memory 96 may store additional information as well. A controller 98 may be operably coupled to the memory 96 and to the touch screen display 94. In some cases, the controller 98 is configured to provide control signals 93 for controlling the one or more HVAC components in accordance with the programmable schedule that is stored in the memory 96.

In some cases, the controller 98 may be configured to permit a user to navigate through a linearly ordered series of screens on the touch screen display 94 to sequentially display one or more of the plurality of schedule periods of the programmable schedule, wherein each displayed schedule period screen includes a plurality of schedule parameters concurrently displayed on the touch screen display 94 that, as will be discussed, can be individually selected by the user for editing by touching the corresponding schedule parameter via the touch screen display 94. In some cases, a linearly ordered series of screens may pertain to a series of screens, each pertaining to a single day, showing several schedule parameters on the screen. For example, a first screen showing one or more schedule parameters for Monday, followed by a second screen showing one or more schedule parameters for Tuesday, and so on. The one or more schedule parameters shown for Tuesday may be the same schedule parameters (although they may have different values) as the one or more schedule parameters shown for Monday, for example, although they do not have to be. In some cases, a linearly ordered series of screens may pertain to a sequential series of screens, each showing a particular time period within a single day (or a group of days such as MON-FRI, or SAT-SUN), showing several schedule parameters pertaining to that particular time period. For example, a first screen may show schedule parameters for a WAKE period on a Thursday, followed by a second screen showing schedule parameters for an AWAY period on Thursday, and so on. In some cases, a linearly ordered series of screens may pertain to a sequential series of screens, each showing a particular time period within a single day, showing several schedule parameters pertaining to that particular time period, and after the screens that pertain to the day (or group of days) are displayed, a similar series of screens may be displayed for the following day (or group of days), and so on.

Figure 5:
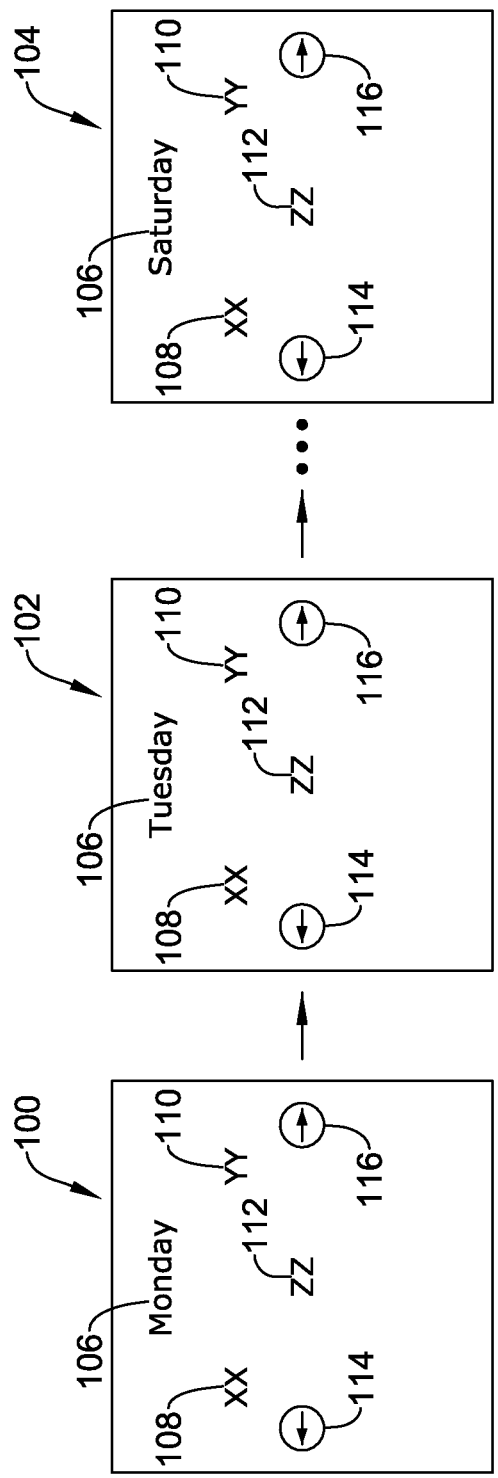
FIGS. 5A through 5C schematically show an illustrative but non-limiting example of a linearly ordered series of screens.

FIGS. 5A through 5C schematically show an illustrative but non-limiting example of a linearly ordered series of screens. In FIG. 5A, the touch screen display 94 (FIG. 3 or FIG. 4) can be seen as showing a screen 100 that generically represents a time period for a Monday. FIG. 5B includes a screen 102 that generically represents a time period for a Tuesday. FIG. 5C includes a screen 104 that generically represents a time period for a Saturday. It will be appreciated that the touch screen display 94 may display additional screens (not shown) pertaining to other days of the week. Each of the screens 100, 102, 104 display a day parameter 106, an xx parameter 108, a yy parameter 110 and a zz parameter 112. It will be appreciated that the relative locations of the day parameter 106, the xx parameter 108, the yy parameter 110 and the zz parameter 112 are merely illustrative, and are not intended to be limiting in any way. The xx parameter 108, the yy parameter 110 and the zz parameter 112 may be considered as generically representing any number of different HVAC controller parameters, and may represent schedule parameters. Examples include but are not limited to a current temperature, a heating temperature set point, a cooling temperature set point, fan conditions, and the like. More particular examples of these parameters will be shown with respect to subsequent Figures.

In some cases, a user may be able to move sequentially through the screens, Monday to Tuesday, Tuesday to Wednesday, and so on. In some cases as illustrated, each of the screens 100, 102, 104 also display a back arrow 114 and a forward arrow 116. A user may sequentially scroll through the screens 100, 102, 104 (and others) simply by pressing the back arrow 114 and/or the forward arrow 116. For example, if currently viewing the screen 100, pressing the forward arrow 116 will cause the screen 102 to appear on the touch screen display 94. If currently viewing the screen 102, pressing the back arrow 114 will cause the screen 100 to reappear on the touch screen display 94. If currently viewing the screen 102, pressing the forward arrow 116 will cause a subsequent screen, for Wednesday as the date parameter 106, to appear.

It will be appreciated that the day parameter 106 may display a single day of the week, or may display a range of days. For example, in a seven day programmable schedule, each day of the week may be uniquely programmed and thus the day parameter 106 may display a single day of the week. In a five-two programmable schedule, the five weekdays Monday through Friday are not uniquely programmed, and in these cases the day parameter 106 may for example display "MON-FRI".

Figure 6:
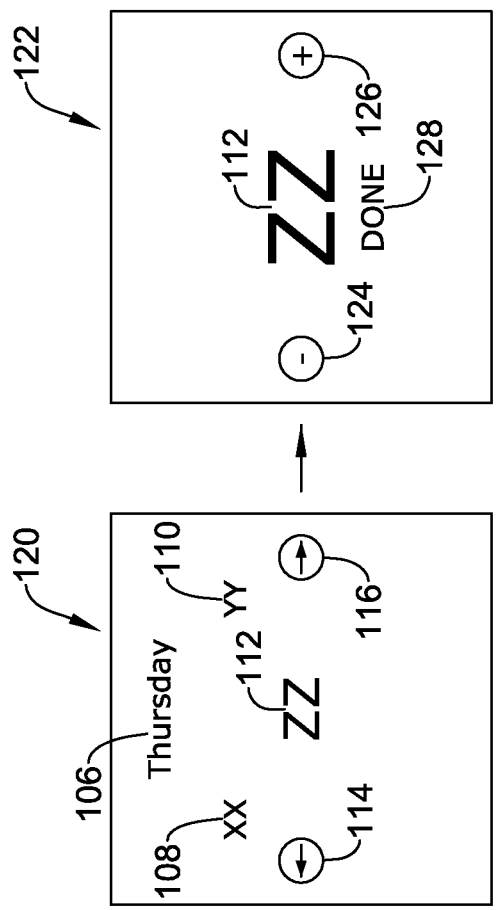
FIGS. 6A and 6B schematically show an illustrative but non-limiting example of editing a parameter value within one of a series of screens.

In some cases, the controller 98 is configured to permit the user to edit the selected schedule parameter and then to navigate to another of the plurality of schedule periods of the programmable schedule after selecting and/or editing a selected schedule parameter. This may be seen, for example, in FIGS. 6A and 6B. FIG. 6A shows a screen 120 that may be displayed on the touch screen display 94 by the controller 98 if, for example, the user selects the forward arrow 116 twice, starting at the screen 102 of FIG. 5B which shows Tuesday as the date parameter 106. Alternatively, the screen 120 may be displayed if the user selects the back arrow 114 twice, starting at the screen 104 of FIG. 5C, which shows Saturday as the date parameter 106. If the user decides to edit one of the parameters shown on the screen 120, they may do so simply by touching the desired parameter. For example, if the user touches the zz parameter 112, the controller 98 may cause a screen 122 of FIG. 6B to be displayed on the touch screen display 94.

FIG. 6B shows screen 122, in which it can be seen that the zz parameter 112 is the only parameter currently displayed. In some cases, the displayed parameter such as the zz parameter 112 may be displayed in a larger or otherwise more dominant font or color. The displayed parameter may be displayed in a heavier line, or in a different color. The displayed parameter may, for example, blink on and off. By not displaying other parameters, it is easier for the user to see and understand which parameter they are looking at and potentially editing. The value of the zz parameter 112 may, for example, be decreased by touching a MINUS sign 124 and may be increased by touching a PLUS sign 126. In some cases, it will be appreciated that the MINUS sign 124 and the PLUS sign 126 may be located, relative to the back arrow 114 and the forward arrow 116, such that the MINUS sign 124 and the back arrow 114 both align with a single touch point on the touch screen display and the PLUS sign 126 and the forward arrow 116 both align with a single touch point on the touch screen display different from that of the MINUS sign 124 and the back arrow 114. In some cases, the user may touch a DONE button 128 to signify that they are done editing the displayed parameter such as the zz parameter 112. Touching the DONE button 128 may cause the controller 98 to revert to the previous screen, such as the screen 120 of FIG. 6A.

In some cases, as seen for example in FIGS. 6A and 6B, when a user selects one of the plurality of schedule parameters for editing, the controller 98 (see FIG. 3) may for example be configured to highlight the selected one of the plurality of schedule parameters, such as by bolding or making larger, and to display an increase touch region (such as but not limited to the PLUS button 126) that the user can use to increase a value of the selected one of the plurality of schedule parameters, and a decrease touch region (such as but not limited to the MINUS button 124) that the user can use to decrease the value of the selected one of the plurality of schedule parameters. In some cases, once one of the plurality of schedule parameters have been selected for editing, the controller may be configured to not display other of the plurality of schedule parameters while displaying the increase touch region 116 and the decrease touch region 114. This is illustrated for example in FIG. 6B, where only the selected parameter zz 112 is shown, and other parameters that were shown in FIG. 6A are not shown in FIG. 6B. In some cases, for example, the plurality of schedule parameters may include a starting time for a particular schedule period and/or a current temperature setpoint for the particular schedule period. The current temperature setpoint may be a heating temperature setpoint or a cooling temperature setpoint.

As discussed with respect to FIGS. 5A through 5C, a user may scroll sequentially through individual day screens by pressing the back arrow 114 and the forward arrow 116 as desired. In some cases, as noted, a particular day may have more than one time period. In some cases, for example, a particular day may have four distinct time periods, such as but not limited to a WAKE period, an AWAY period, a HOME period and a SLEEP period. The WAKE period, for example, corresponds to the environmental conditions desired when the user (and other people) first get up in the morning, and before they leave for work or school. The AWAY period corresponds to desired conditions when the house is empty, i.e., once all of the occupants have left for work or school or other plans for the day. The HOME period corresponds to desired conditions once the occupants have returned home for the evening. The SLEEP period corresponds to desired conditions for sleeping. It will be appreciated that these definitions can vary, depending on the needs of the people living in the house. For example, someone working a second shift or a third shift may have different definitions and/or desired environmental conditions for each time period, relative to someone working a first shift.

Figure 7:
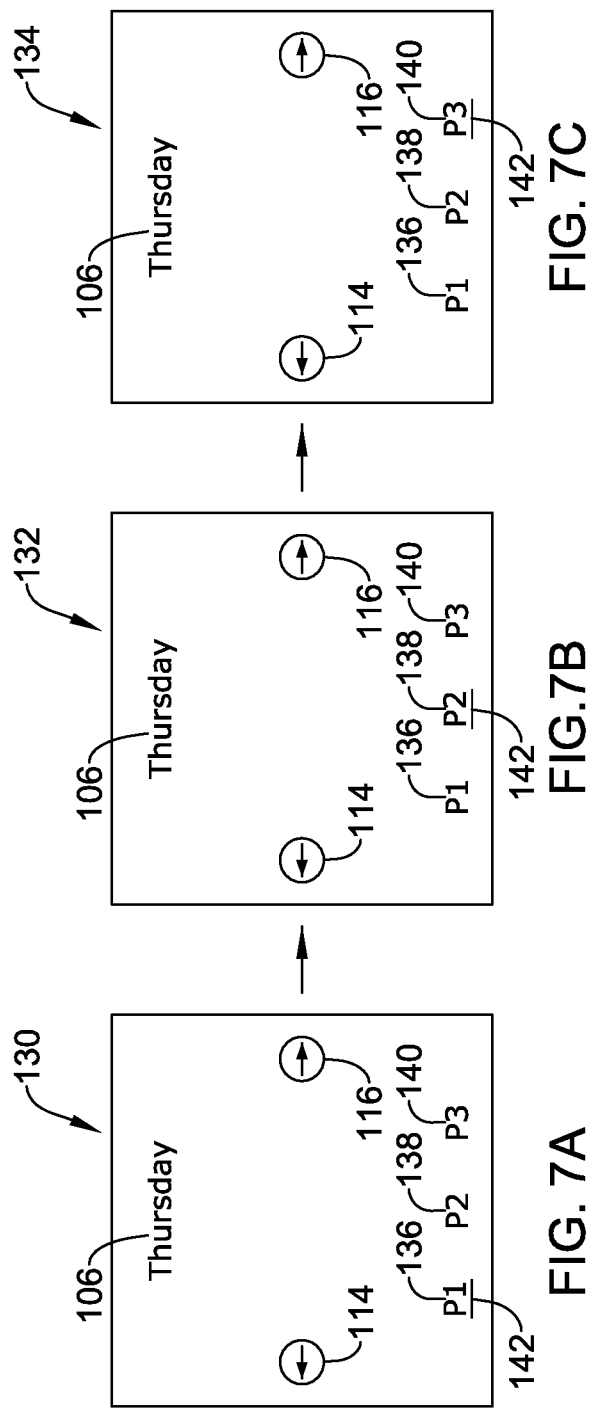
FIGS. 7A through 7C schematically show an illustrative but non-limiting example of a linearly ordered series of screens.

In some cases, a user may scroll sequentially through several time periods for a single day (or group of days) by pressing the back arrow 114 and/or the forward arrow 116, as desired. This is illustrated for example in FIGS. 7A through 7C, which schematically show an illustrative but non-limiting example of a linearly ordered series of screens in which a user is able to move linearly between screens showing different time periods. In FIGS. 7A through 7C, a P1 indicator 136 indicates a first time period, a P2 indicator 138 indicates a second time period and a P3 indicator 140 indicates a third time period. In some cases, the P1 indicator 136, the P2 indicator 138 and/or the P3 indicator 140 may each generically represent one or more of a WAKE period, an AWAY period, a RETURN period and/or a SLEEP period, for example.

In FIG. 7A, the P1 indicator 136 has been selected, meaning for example that the first time period, corresponding to the P1 indicator 136, has been selected to be displayed on the screen 130. In some cases, and as illustrated, this may be shown by a bar 142 that is illuminated or otherwise displayed underneath the P1 indicator 136. In some cases, the bar 142 may blink, or otherwise indicate selection of the P1 indicator 136. In some instances, instead of the bar 142 appearing, or perhaps in addition to the bar 142 appearing, the P1 indicator 136 itself may blink, or be bolded, or illuminated in order to make it easy to see which time period is being displayed. It will be appreciated that in some cases, the screen 130 may also include other information, such as but not limited to the xx parameter 108, the yy parameter 110 and/or the zz parameter 112 as discussed with respect to FIGS. 5A through 5C and FIGS. 6A and 6B.

In some cases, the P1 indicator 136 may be selected by simply pressing the P1 indicator 136, particularly if the P1 indicator 136 corresponds to a touch point on the screen 94. In some instances, the P1 indicator 136 may be selected by moving forward or backwards from a display displaying a different time period by pressing the back arrow 114 and/or the forward arrow 116, as desired. For example, from the screen 130 shown in FIG. 7A, pressing the forward arrow 116 may cause a screen 132, shown in FIG. 7B, to be displayed. It can be seen in FIG. 7B that the P2 indicator 138 has been selected, as the bar 142 appears below the P2 indicator 138. Pressing the forward arrow 116 again will cause a screen 134, shown in FIG. 7C, to be displayed. It can be seen in FIG. 7C that the P3 indicator 140 has been selected, as the bar 142 appears below the P3 indicator 140. Pressing the back arrow 114 while on the screen 132 (FIG. 7B) will cause the screen 130 (FIG. 7A) to be displayed. Accordingly, the controller 98 (FIG. 3) may be considered as being configured to display a back touch region (such as but not limited to the back arrow 114) and/or a next touch region (such as but not limited to the forward arrow 116) that permit the user to navigate sequentially through the linearly ordered series of screens (such as but not limited to the screens 130, 132, 134) to display each of the plurality of schedule periods of the programmable schedule.

It will be appreciated that FIGS. 5A through 5C, 6A and 6B, and FIGS. 7A through 7C show generic screens that may be displayed on the display 94 of the HVAC controller 90 (FIG. 4). These generic screens show parts or features of screens that can be displayed. The HVAC controller 90 may, for example, be configured to display information to a user and/or to receive information from the user via a user interface that can take any of a wide variety of forms. The following Figures provide examples of an illustrative but non-limiting user interface, in form and function, which may be generated by the HVAC controller 90. For example, FIG. 8 shows a home screen 150 that may be generated and displayed by the HVAC controller 90.

Figure 8:
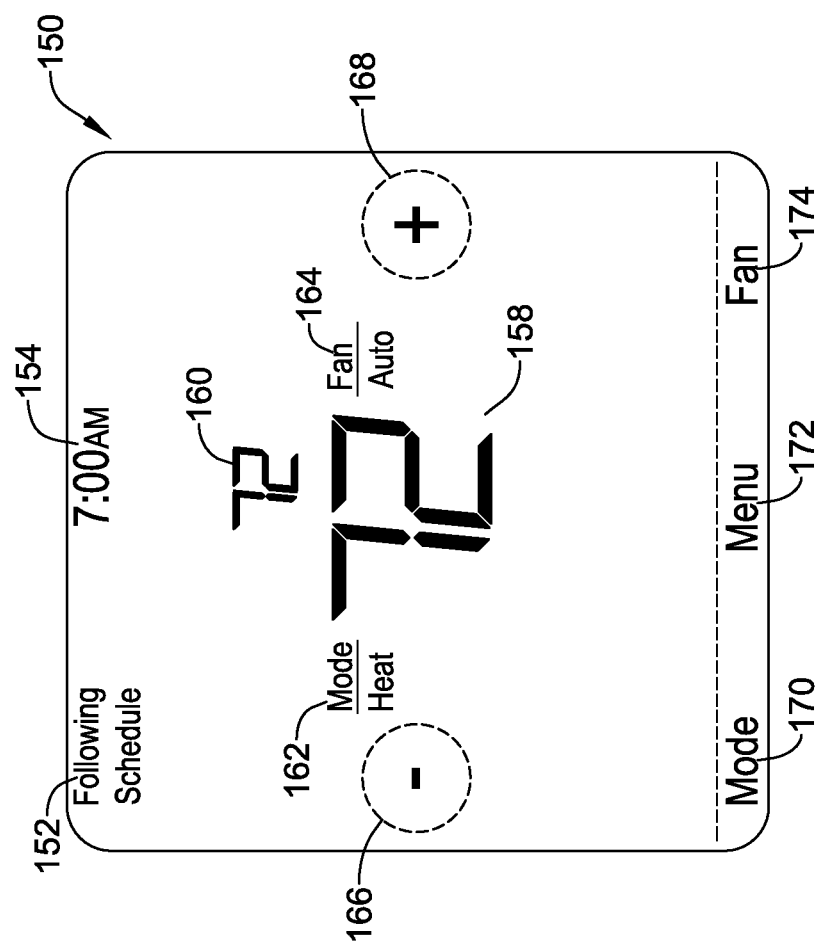
FIG. 8 schematically shows a home screen that may be displayed by the HVAC controller of FIG. 3 or FIG. 4.

In some cases, the home screen 150 as shown in FIG. 8 may include a FOLLOWING SCHEDULE icon 152, which indicates to the user that the HVAC controller 90 (FIG. 4) is operating the HVAC equipment 4 (FIG. 1 or FIG. 2) in accordance with whatever programmable schedule has been entered into the HVAC controller 90. In some instances, the home screen 150 may be considered as being a starting point from which a user may view various scheduling parameters, edit various scheduling parameters, make changes to equipment settings, and the like. In some cases, the home screen 150 may display a variety of different parameters that may, for example, be considered as being illustrative but non-limiting examples of one or more of the xx parameter 108, the yy parameter 110 and/or the zz parameter 112 discussed with respect to previous Figures. The home screen 150 includes, for example, a time icon 154 that indicates a present time so that the user can verify that the HVAC controller 90 is set to the correct time as this can negatively impact a programmable schedule if the time is not set correctly. A Wi-Fi icon 156 indicates that the HVAC controller 90 is, for example, successfully connected to a local network.

Across the center of the home screen 150, the HVAC controller 90 may be seen as displaying a current temperature icon 158 and a current temperature setpoint icon 160. In some cases, the current temperature icon 158 is displayed in a larger or otherwise more noticeable font so that the user can easily read the current temperature. Display of the current temperature setpoint icon 160 provides the user with quick verification that the system is working correctly, i.e., that the current temperature matches the temperature setpoint. This also enables the user to see, via display of the current temperature setpoint, if the current temperature setpoint is as expected. For example, if the HVAC controller 90 is operating under a programmable schedule that expects the house to be empty at a particular time of day, the temperature setpoint may be chosen more for energy efficiency than for comfort. If a person has unexpectedly stayed home that day, they will be able to see that the temperature setpoint has been automatically adjusted for energy efficiency, and they can temporarily adjust the temperature setpoint to maintain their comfort without waiting for the house temperature to drop (or increase) to that energy efficient setting.

The illustrative home screen 150 also includes a mode icon 162 that informs the user what mode the system is in, such as heat mode (as illustrated), cool mode, or system off. A fan icon 164 informs the user as to what mode the system fan is in. In some cases, the fan mode may be AUTO, meaning that the fan only runs when the conditioning equipment (e.g. heater, air conditioner, humidifier, etc.) is running. If the system is in heat mode (as shown), for example, having the fan mode in AUTO means the fan will only run when the furnace burner is running (plus a short time period before burner ignition and a short time period after the burner goes off). If in cool mode, and the fan mode is AUTO, the fan will only run when the air conditioning is running (plus a short time period after the air conditioner goes off). In some cases, the fan mode may be ON, in which case the fan runs continuously to help circulate air within the house, or perhaps to accommodate an air exchanger. A MINUS button 166 and a PLUS button 168, which may for example represent the previously discussed MINUS button 124 (FIG. 6B) and the previously discussed PLUS button 126, may be used to alter the value of variously displayed system and schedule parameters. In some cases, it will be appreciated that the MINUS button 166 and/or the PLUS button 168 may each coincide with touch points formed within the touch screen display 94.

Figure 9:
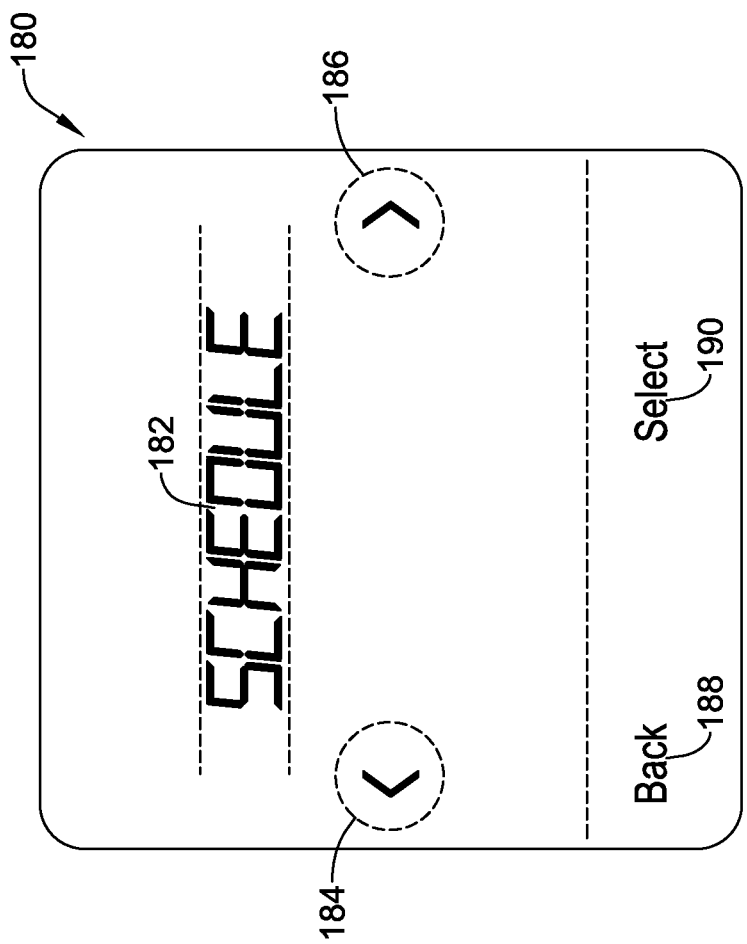
FIG. 9 schematically shows a schedule screen that may be displayed by the HVAC controller of FIG. 3 or FIG. 4.

Across the bottom of the home screen 150, the HVAC controller 90 may be seen as displaying a MODE button 170, a MENU button 172 and a FAN button 174. In some cases, the MODE button 170, the MENU button 172 and/or the FAN button 174 may each coincide with touch points formed within the touch screen display 94. It will be appreciated that in some cases, the MODE button 170 may, for example, be used to change the system from heat mode to cool mode, or cool mode to heat mode, or from heat mode to OFF or from cool mode to OFF. The FAN button 174 may be used to change the fan mode from ON to AUTO, or from AUTO to ON, for example. The MENU button 172 enables a user to reach various menus that are programmed into the HVAC controller 90 and thus can be displayed on the display 94. In some cases, one of the menus that may be reached via the MENU button 172 is a schedule menu, an example of which is shown in FIG. 9. Other menus that may be accessible via the MENU button 172 include but are not limited to ALERTS, LOCK SCREEN, WIFI settings, BACKLIGHT settings, RECOVERY, CLOCK, DATE, CLEAN SCREEN, TEMP SCALE (F or C), RESET, EQUIPMENT STATUS, DEVICE INFO and the like. A user may scroll through these menu options via a BACK button 184 and a FORWARD button 186.

FIG. 9 shows a SCHEDULE screen 180 that may be displayed by the HVAC controller 90, such as in response to a user interacting with a menu reached via the MENU button 172 shown in FIG. 8. In some cases, the SCHEDULE screen 180 may enable a user to enter a new programmable schedule, and/or to edit an existing programmable schedule. In some cases, there may be several different menus accessible via the MENU button 172. In some instances, the BACK button 184 and a FORWARD button 186 may be used, as appropriate, to scroll left and right through each of several different menu possibilities. In some cases, the BACK button 184 and/or the FORWARD button 186 may each coincide with touch points formed within the touch screen 94. In some instances, and as can be seen comparing FIG. 8 and FIG. 9, the BACK button 184 may largely share a location with the MINUS button 162, and the FORWARD button 186 may largely share a location with the PLUS button 164. Accordingly, it will be appreciated that in some cases, the BACK button 184 and the MINUS button 162 may share a single touch point. Similarly, in some cases, the FORWARD button 186 and the PLUS button 164 may share a single touch point.

The SCHEDULE screen 182 may, for example, include a back button 188 that enables the user to return to the home screen 150. A select button 190 enables the user to instruct the HVAC controller 90 to enter the scheduling menu so that the user can make any desired changes to the programmable schedule. In some cases, it will be appreciated that the back button 188 and the select button 190 each coincide with touch points formed in the touch screen display 94. In some cases, the back button 188 may largely share a location with the MODE button 170 (FIG. 8) and the select button 190 may largely share a location with the MENU button 172. Accordingly, it will be appreciated that in some cases, the back button 188 and the MODE button 170 may share a single touch point. Similarly, in some cases, the select button 190 and the MENU button 172 may share a single touch point.

Figure 10A:
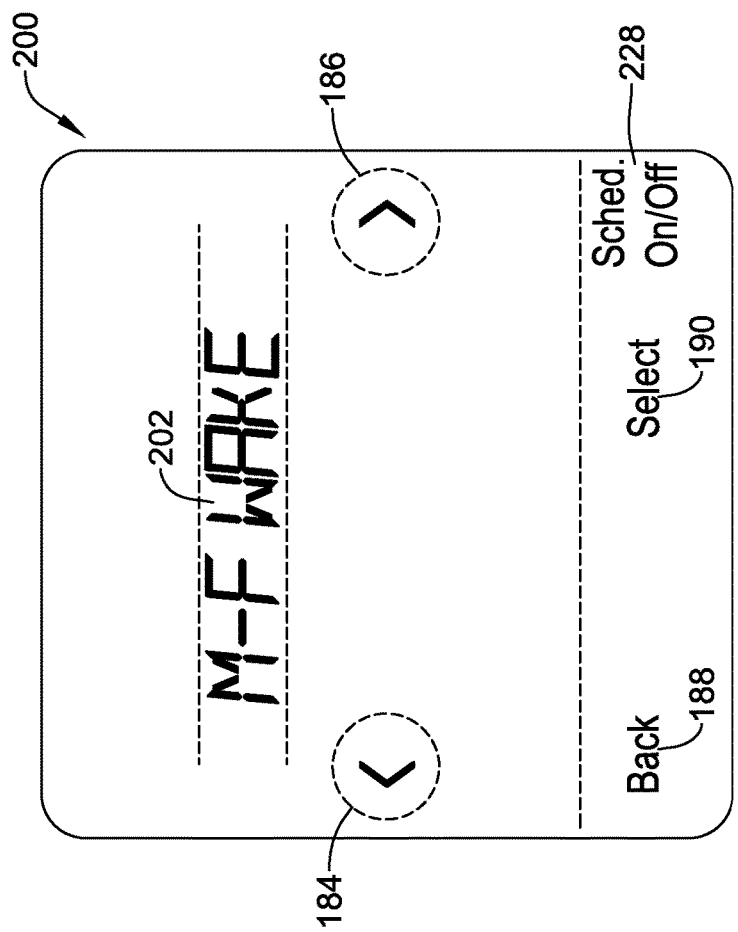
FIG. 10A schematically shows a time period screen that may be displayed by the HVAC controller of FIG. 3 or FIG. 4.

FIG. 10A shows a screen 200 that may be displayed by the HVAC controller 90 in response to a user selecting the select button 190 shown in FIG. 9. The screen 200 includes a PERIOD SELECTOR identifier 202 that indicates which day of the week is being displayed as well as indicating which time period is being displayed. Selecting the PERIOD SELECTOR identifier 202 may cause display of a screen that enables a user to edit one or more parameters corresponding to the displayed DAY and PERIOD, as will be discussed with respect to subsequent Figures.

In a schedule in which weekdays are all treated identically, the PERIOD SELECTOR identifier 202 may display a range of days, such as MON-FRI, or M-F, as illustrated. In other schedules, for example, in a seven day schedule, a single day of the week may be displayed, such as MON, or TUES, as appropriate. As can be seen, the PERIOD SELECTOR identifier 202 also indicates a currently displayed PERIOD. As seen in the screen 200, the WAKE period has been identified. In some cases, particularly if a total of four time periods are being used, the PERIOD SELECTOR identifier 202 may alternately read WAKE, AWAY, HOME and SLEEP, as appropriate. The screen includes the BACK button 184 and the FORWARD button 186 that may be used, for example, to advance between adjacent screens, as shown in FIGS. 10A through 10E.

The back button 188 enables the user to return a previous screen, such as but not limited to, the home screen 150. The select button 190 enables the user to instruct the HVAC controller 90 to enter the scheduling menu so that the user can make any desired changes to the programmable schedule. The screen 200 includes a SCHED ON/OFF button 228. In some cases, the SCHED ON/OFF button 228 may be used if a user wishes to not operate in accordance with a schedule, but rather just wants to run the HVAC controller 90 manually (or in accordance with a geo-fence capability if provided). If they are hot, they turn down the temperature. If cold, they turn it up. Comparing FIG. 10A to FIG. 8, it can be seen for example that the back button 188 may largely share a location with the MODE button 170, the select button 190 may largely share a location with the MENU button 172 and the SCHED ON/OFF button 228 may largely share a location with the FAN button 174 in order to share respective touch points.

Figure 10B:
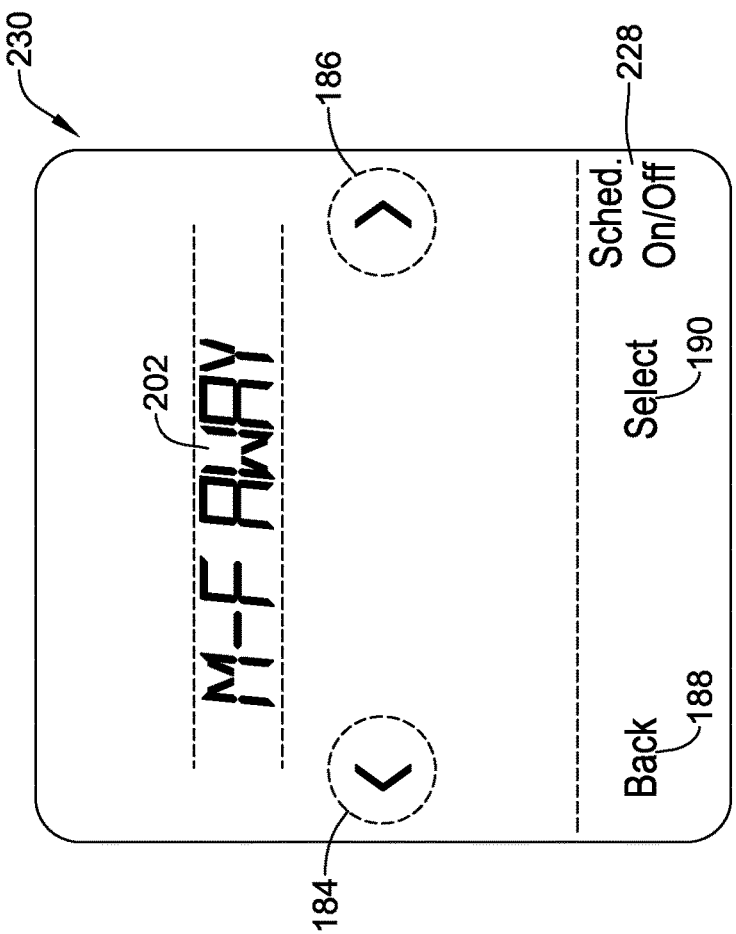
Figure 10C:
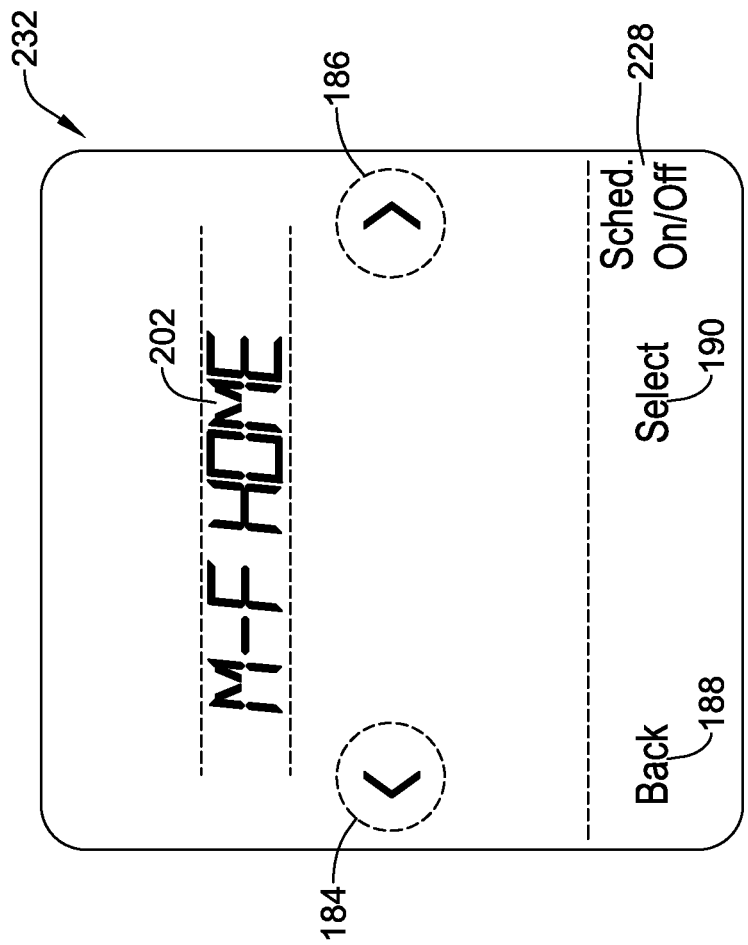
Figure 10D:
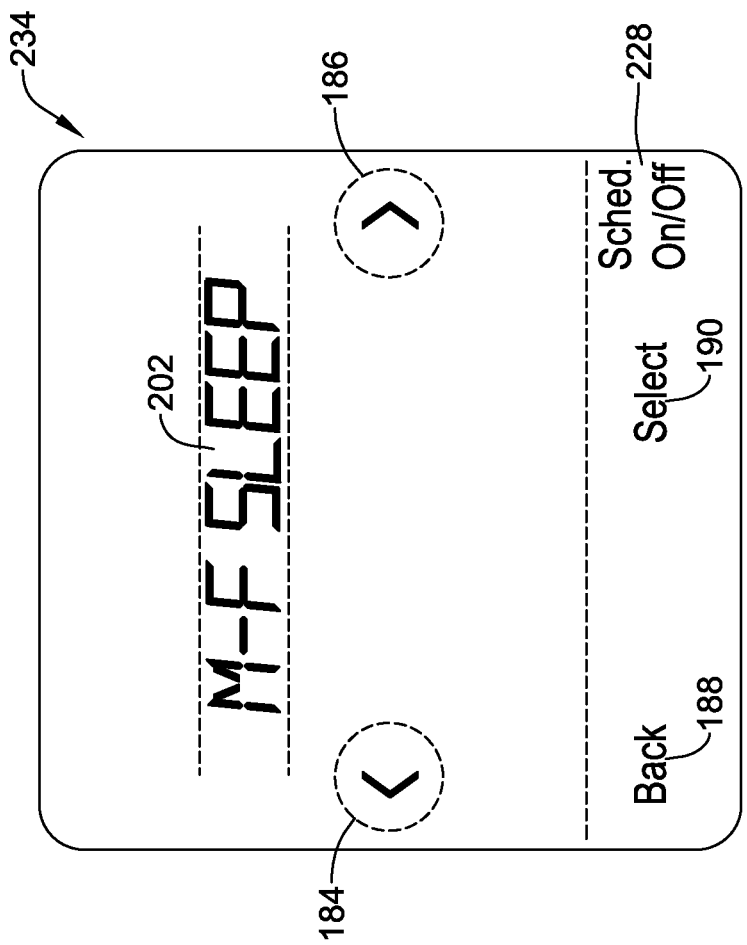
Figure 10E:
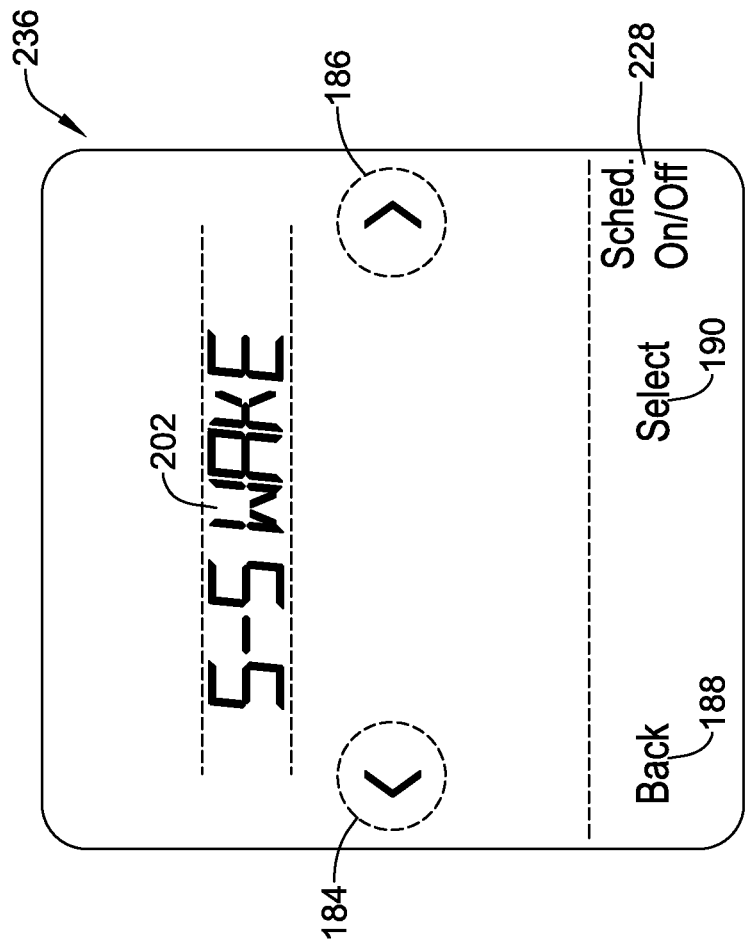

From the screen 200, pressing the FORWARD button 186 may cause the HVAC controller 90 to display a screen 230, as seen in FIG. 10B, in which the PERIOD SELECTOR identifier 202 indicates M-F AWAY. Pressing the FORWARD button 186 again may cause the HVAC controller 90 to display a screen 232, as seen in FIG. 10C, in which the PERIOD SELECTOR identifier 202 indicates M-F HOME. Pressing the FORWARD button 186 again may cause the HVAC controller 90 to display a screen 234, as seen in FIG. 10D, in which the PERIOD SELECTOR identifier 202 indicates M-F SLEEP. Pressing the FORWARD button 186 again may cause the HVAC controller 90 to display a screen 236, as seen in FIG. 10E, in which the PERIOD SELECTOR identifier 202 indicates S-S WAKE. It will be appreciated that a user may scroll in either direction through the screens 200, 230, 232, 234 and 236 as desired, using the BACK button 184 and/or the FORWARD button 186, as desired. It will be appreciated that additional screens may also be displayed. For example, in a seven day schedule, the HVAC controller 90 may enable the user to scroll through screens identifying MON WAKE, MON LEAVE, MON HOME, MON SLEEP, TUE WAKE, and so on through the week.

Figure 11A:
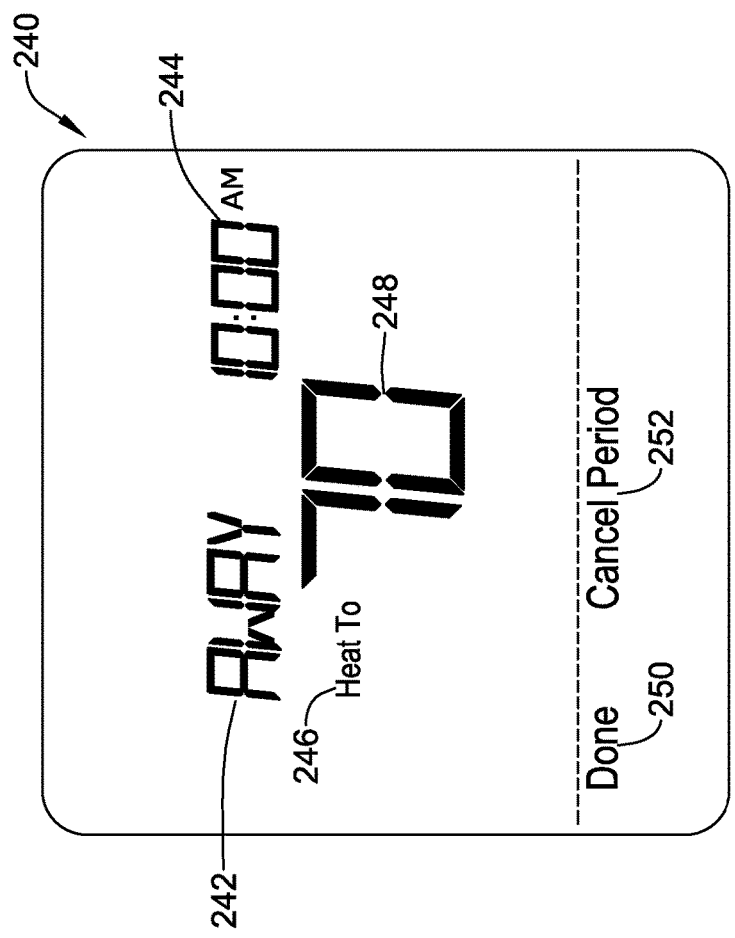
FIGS. 11A through 11D schematically show a series of screens that may be displayed by the HVAC controller of FIG. 3 or FIG. 4.

FIGS. 11A through 11D provide some examples of how a user may view and/or edit various comfort parameters within one or more time periods, and over one or more days or groups of days. Returning briefly to FIG. 10B, pressing the select button 190 may cause the HVAC controller 90 to display a screen 240, as shown in FIG. 11A. In some cases, pressing the PERIOD SELECTOR identifier 202 may also cause the HVAC controller 90 to display the screen 240. In FIG. 11A, the screen 240 includes a PERIOD icon 242 indicating the AWAY time period as well as a TIME icon 244 indicating that the AWAY time period, at least for that day/date, begins at 10:00 AM. A system indicator 246 indicates that it is a heating temperature setpoint that is being displayed, and a temperature indicator 248 provides the current temperature setpoint. The screen 240 includes a done button 250 that if selected informs the HVAC controller 90 that the user has finished making edits. The screen 240 includes a CANCEL PERIOD button 252. In some instances, the CANCEL PERIOD button 252 may be used to delete a time period from the schedule. For example, if someone is home all day, such as a parent home with a small child, it may make sense to delete the AWAY period.

Figure 11B:
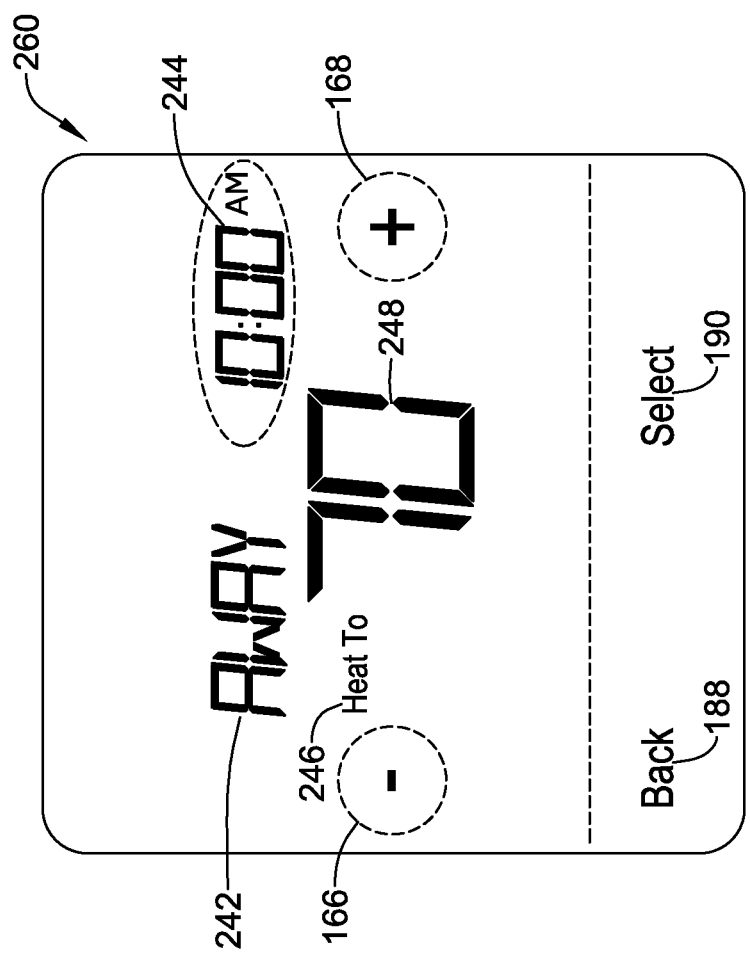

If a user wishes to edit one of the displayed parameters, they may simply press the desired icon. For example, pressing the TIME icon 244 may cause the HVAC controller 90 to display a screen 260, as shown in FIG. 11B. As can be seen in FIG. 11B, the TIME icon 244 is now illuminated, indicating that the TIME icon 244 has been selected and that the starting time for the displayed time period may be edited. If the user wishes to change the starting time, they may do so by using the MINUS button 166 and/or the PLUS button 168, as appropriate. Once finished, they may press the select button 190. In some cases, the HVAC controller 90 may display a message on the screen, or perhaps display a separate screen, that indicates to the user that the change or changes have been saved.

Figure 11C:
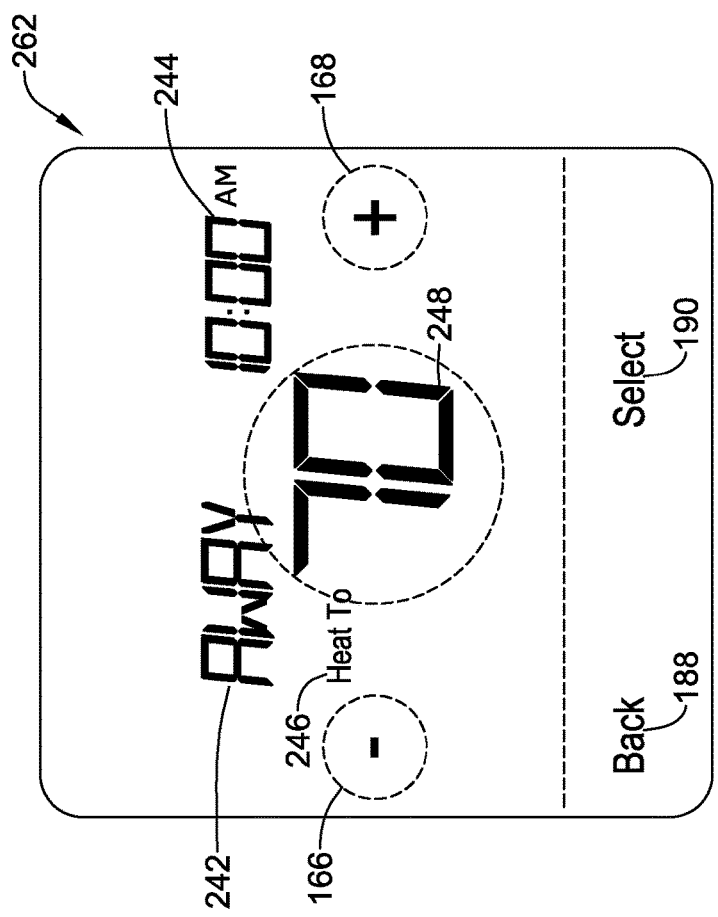

In some cases, pressing the select button 190 also causes the HVAC controller 90 to move on and display an active set point. FIG. 11C shows a screen 262 in which the temperature icon 248 is illuminated, indicating that the user can raise or lower the displayed temperature using the MINUS button 166 and/or the PLUS button 168, as appropriate. In some cases, the HVAC controller 90 may also display the screen 262 as a result, for example, of the user directly selecting the temperature icon 248 as shown on the screen 240 (FIG. 11A). Once the user is done changing the active set point (which as indicated by the system indicator 246), they may press the select button 190. In response, the HVAC controller 90 may save the changes, if any, and optionally confirm to the user that the change(s) have been saved. In some cases, the HVAC controller 90 may subsequently display a screen 264, as shown in FIG. 11D.

Figure 11D:
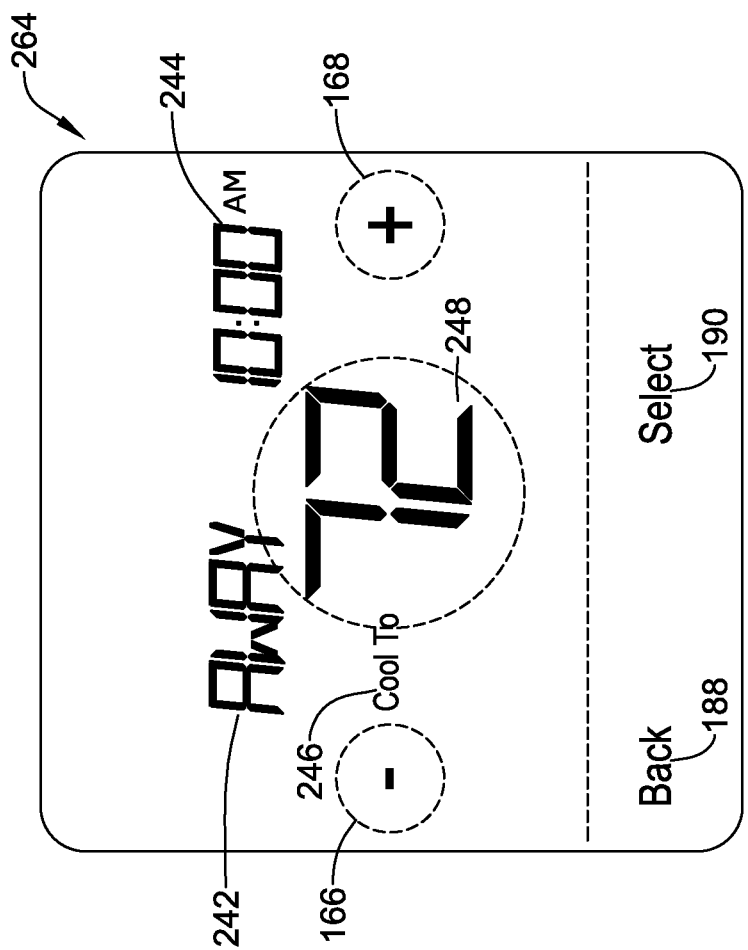

In FIG. 11D, the screen 264 enables the user to edit (if they desire) the inactive temperature setpoint. As indicated by the system indicator 246, this is a cooling temperature setpoint that is available to be edited. The temperature icon 248 is illuminated, meaning that the user may raise or lower the cooling temperature setpoint, for the AWAY time period, by pressing the MINUS button 166 and/or the PLUS button 168, as appropriate.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. An HVAC controller configured to control one or more HVAC components in accordance with a programmable schedule, wherein the programmable schedule includes a plurality of schedule periods, the HVAC controller comprising:
   a housing for housing:
      a touch screen display accessible from outside of the housing;
      a memory configured to store the programmable schedule;
      a controller operably coupled to the memory and the touch screen display, the controller configured to control the one or more HVAC components in accordance with the programmable schedule;
      the controller further configured to permit a user to navigate through a linearly ordered series of screens to display each of the plurality of schedule periods of the programmable schedule on a separate one of the linear ordered series of screens, wherein each displayed schedule period includes a corresponding time parameter and a corresponding temperature setpoint concurrently displayed on the touch screen display that can be individually selected by the user for editing by selecting the displayed schedule period, which enters an editing mode, and then touching the corresponding displayed time parameter and/or the displayed temperature setpoint via the touch screen display;

the controller further configured to permit the user to edit the selected time parameter or selected temperature setpoint while in the editing mode by touching a first predefined touch region on the touch screen display to increase the selected time parameter or increase the selected temperature setpoint and by touching a second predefined touch region on the touch screen display to decrease the selected time parameter and/or decrease the selected temperature setpoint; and the controller further configured to permit the user to navigate to another of the plurality of schedule periods of the programmable schedule after selecting and/or editing a selected time parameter or selected temperature setpoint of the selected schedule period by first exiting the editing mode and then touching the first predefined touch region or the second predefined touch region.

2. The HVAC controller of claim 1, wherein the controller is configured to display a back touch region and/or a next touch region that permit the user to navigate through the linearly ordered series of screens to display each of the plurality of schedule periods of the programmable schedule, wherein the back touch region corresponds to the first predefined touch region and the next touch region corresponds to the second predefined touch region.

3. The HVAC controller of claim 1, wherein when the user selects one of the displayed time parameter or the displayed temperature setpoint for editing, the controller is configured to highlight the selected one of the displayed time parameter or the displayed temperature setpoint and to display an increase touch region that the user can use to increase a value of the selected one of the displayed time parameter or the displayed temperature setpoint and a decrease touch region that the user can use to decrease the value of the selected one of the displayed time parameter or the displayed temperature setpoint, wherein the decrease touch region corresponds to the first predefined touch region and the increase touch region corresponds to the second predefined touch region.

4. The HVAC controller of claim 3, wherein in response to the user selecting one of the displayed time parameter or the displayed temperature setpoint for editing, the controller is configured to not display the other of the time parameter or the temperature setpoint while displaying the increase touch region and the decrease touch region.

5. The HVAC controller of claim 1, wherein the plurality of schedule periods comprises a WAKE period, an AWAY period, a HOME period and a SLEEP period.

6. The HVAC controller of claim 1, wherein the time parameter include a starting time for the corresponding schedule period.

7. An HVAC controller configured to control one or more HVAC components in accordance with a programmable schedule, wherein the programmable schedule includes a plurality of schedule periods, the HVAC controller comprising:

a fixed segment touch screen display;

a memory configured to store the programmable schedule;

a controller operably coupled to the memory and the fixed segment touch screen display, the controller configured to control the one or more HVAC components in accordance with the programmable schedule;

the controller including a schedule edit mode, wherein once in the schedule edit mode, the controller is configured to:

permit a user to navigate to a selected one of the plurality of schedule periods;

for the selected schedule period, concurrently display a corresponding time parameter and a corresponding temperature setpoint on the fixed segment touch screen display, while not displaying the time parameters and the temperature setpoints for non-selected ones of the plurality of schedule periods;

while concurrently displaying the time parameter and the temperature setpoint for the selected schedule period, permit the user to select one of the displayed time parameter and the displayed temperature setpoint for editing by touching the desired displayed time parameter or displayed temperature setpoint on the fixed segment touch screen display; and permit the user to change a value of the selected one of the time parameter and temperature setpoint by interacting with the fixed segment touch screen display.

8. The HVAC controller of claim 7, wherein the controller is further configured to display one or more touchable buttons that permit the user to enter the schedule edit mode.

9. The HVAC controller of claim 7, wherein when the user has not selected one of the displayed time parameter and the displayed temperature setpoint for editing, the controller is configured to display a back touch region and/or a next touch region that permit the user to navigate to a selected one of the plurality of schedule periods.

10. The HVAC controller of claim 7, wherein when the user selects one of the displayed time parameter and the displayed temperature setpoint for editing, the controller is configured to highlight the selected one of the time parameter and the temperature setpoint and to display an increase touch region that the user can use to increase the value of the selected one of the time parameter and the temperature setpoint and a decrease touch region that the user can use to decrease the value of the selected one of the time parameter and the temperature setpoint.

11. The HVAC controller of claim 10, wherein in response to the user selecting one of the displayed time parameter and the displayed temperature setpoint for editing, the controller is configured to not display other of the time parameter and the temperature setpoint while displaying the increase touch region and the decrease touch region.

12. The HVAC controller of claim 10, wherein the controller is further configured to display a touchable button on the fixed segment touch screen display that the user may touch to exit the schedule edit mode.

13. The HVAC controller of claim 7, wherein the plurality of schedule periods comprise a WAKE period, an AWAY period, a HOME period and a SLEEP period.

14. The HVAC controller of claim 7, wherein the time parameter include a starting time for the corresponding schedule period.

15. The HVAC controller of claim 7, wherein the fixed segment touch screen display comprises eight or less touch regions at fixed locations on the fixed segment touch screen display.

16. An HVAC controller configured to control one or more HVAC components in accordance with a programmable schedule, wherein the programmable schedule includes a plurality of schedule periods, the HVAC controller comprising:

a touch screen display defining a plurality of individual touch regions each located at a fixed location on the touch screen display;

a memory configured to store a programmable schedule having a plurality of schedule periods, each of the plurality of schedule periods including a corresponding time parameter and a corresponding temperature setpoint;

a controller operably coupled to the memory and the touch screen display, the controller configured to control the one or more HVAC components in accordance with the programmable schedule;

the controller further configured to permit a user to navigate through a linearly ordered series of screens using one or more of the plurality of individual touch regions to display each of the plurality of schedule periods of the programmable schedule, wherein each displayed schedule period includes concurrently displaying the corresponding time parameter and the corresponding temperature setpoint on the touch screen display with at least one of the corresponding time parameter and the corresponding temperature setpoint displayed at a location on the touch screen display that overlaps with a corresponding one of the plurality of individual touch regions;

the controller is further configured to permit a user to individually select one of the corresponding time parameter and the corresponding temperature setpoint for editing by touching the corresponding individual touch region; and the controller is further configured to permit the user to edit the selected one of the corresponding time parameter and the corresponding temperature setpoint by touching one or more other of the individual touch regions that are defined for that purpose.

17. The HVAC controller of claim 16, wherein one or more of the individual touch regions that are defined to permit the user to edit the selected one of the corresponding time parameter and the corresponding temperature setpoint are the same as the one or more of the plurality of individual touch regions that are used by the user to navigate through the linearly ordered series of screens.

18. The HVAC controller of claim 16, wherein two of the plurality of individual touch regions are used by the user to navigate through the linearly ordered series of screens, wherein a first one of the two of the plurality of individual touch regions includes a LEFT arrow and a second one of the two of the plurality of individual touch regions includes a RIGHT arrow.

19. The HVAC controller of claim 18, wherein when the user selects one of the corresponding time parameter and the corresponding temperature setpoint for editing, the controller is configured to highlight the selected time parameter or temperature setpoint, and change the LEFT arrow of the first one of the plurality of individual touch regions to a MINUS sign and change the RIGHT arrow of the second one of the individual touch regions to a PLUS sign, wherein the first one of the two of the plurality of individual touch regions is usable to decrease a value of the selected time parameter or temperature setpoint and the second one of the plurality of individual touch regions is usable to increase the value of the selected time parameter or temperature setpoint.

* * * * *